(12) United States Patent
Chen et al.

(10) Patent No.: US 12,079,000 B2
(45) Date of Patent: Sep. 3, 2024

(54) SYSTEM FOR LOCATING CHARGING BASE OF SELF-MOVING ROBOT AND METHOD FOR LOCATING CHARGING BASE OF SELF-MOVING ROBOT

(71) Applicant: AMICRO SEMICONDUCTOR CO., LTD., Guangdong (CN)

(72) Inventors: Zhuobiao Chen, Guangdong (CN); Hewen Zhou, Guangdong (CN); Huibao Huang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 376 days.

(21) Appl. No.: 17/624,265

(22) PCT Filed: Nov. 10, 2019

(86) PCT No.: PCT/CN2019/116929
§ 371 (c)(1),
(2) Date: Dec. 31, 2021

(87) PCT Pub. No.: WO2021/003919
PCT Pub. Date: Jan. 14, 2021

(65) Prior Publication Data
US 2022/0374022 A1 Nov. 24, 2022

(30) Foreign Application Priority Data
Jul. 11, 2019 (CN) .......................... 201910623007.1

(51) Int. Cl.
G05D 1/00 (2024.01)
(52) U.S. Cl.
CPC ......... G05D 1/0225 (2013.01); G05D 1/0242 (2013.01); G05D 1/0274 (2013.01)
(58) Field of Classification Search
None
See application file for complete search history.

(56) References Cited

U.S. PATENT DOCUMENTS

| 10,882,187 B2 * | 1/2021 | Li ......................... B25J 9/0003 |
| 2004/0117079 A1 * | 6/2004 | Hulden ................ G05D 1/0217 |
| | | 701/25 |

(Continued)

FOREIGN PATENT DOCUMENTS

EP       3170436 A1 *  5/2017  .......... A47L 9/2805

OTHER PUBLICATIONS

Human-Assisted translation of a portion of Yin Wei, "Design and Implementation of a Sweeping Robot Auotomous Charge System" (Year: 2024).*

(Continued)

*Primary Examiner* — Isaac G Smith
*Assistant Examiner* — Jennifer M Anda
(74) *Attorney, Agent, or Firm* — Samson G. Yu (57) ABSTRACT

The disclosure relates to a system for locating a charging base of a self-moving robot and method for locating a charging base of a self-moving robot. A position of the charging base can estimated according to a charging base locating area constructed when the self-moving robot receives infrared signals of the charging base, meanwhile, the position of the charging base which is estimated can be continuously adjusted according to a relationship between the charging base locating area and infrared signal receivers when the infrared signals are received in the subsequent motion process of the self-moving robot.

5 Claims, 7 Drawing Sheets

(56) References Cited

U.S. PATENT DOCUMENTS

| | | | | |
|---|---|---|---|---|
| 2004/0178767 A1* | 9/2004 | Jeon | ............ | A47L 9/2805 |
| | | | | 320/114 |
| 2012/0323365 A1* | 12/2012 | Taylor | ............ | B25J 19/005 |
| | | | | 901/1 |
| 2017/0102709 A1* | 4/2017 | Kwak | ............ | A47L 9/2847 |
| 2022/0090938 A1* | 3/2022 | Tsurumi | ............ | G06V 20/56 |

OTHER PUBLICATIONS

"Cable Wholesale website, What are Infrared Emitters, Receivers, and Repeaters?" www.cablewholesale.com/support/technical_articles/infrared/php last accessed Mar. 12, 2024 (Year: 2024).*

Yin Wei, "Design and Implementation of a Sweeping Robot Autonomous Charge System", University of Science and Technology of China A Dissertation for Master's Degree of Engineering, No. 01, Jan. 15, 2019(Jan. 15, 2019), ISSN:1674-0246, p. 20, Paragraph 1-p. 21, Paragraph 2, p. 23, Paragraph 3-p. 29, Paragraph 1.

\* cited by examiner

SYSTEM FOR LOCATING CHARGING BASE OF SELF-MOVING ROBOT AND METHOD FOR LOCATING CHARGING BASE OF SELF-MOVING ROBOT

CROSS-REFERENCE TO RELATED APPLICATION

The present disclosure claims the priority of Chinese Patent Application No. 201910623007.1, filed to the China National Intellectual Property Administration on Jul. 11, 2019 and entitled "System for Locating Charging Base of Self-Moving Robot and Method for Locating Charging Base of Self-Moving Robot", which is incorporated herein its entirety by reference.

TECHNICAL FIELD

The disclosure relates to the field of intelligent robots, in particular to a system for locating a charging base of a self-moving robot and a method for locating a charging base of a self-moving robot.

BACKGROUND

The intelligent degree of an self-moving robot which is existed is higher and higher, for the self-moving robot, the operation of automatically returning to a charging base for charging and the like is necessary, however, to realize automatically returning to the charging base, the self-moving robot needs to know a position of the charging base, and an existing method for locating the charging base of a robot is either low in accuracy or assisted by other sensors, such as a Laser Radar (LDS) device, so that a cost for automatically returning to the charging base of the self-moving robot is high, which is not favorable for user experience and product popularization and application.

SUMMARY

The disclosure provides a system for locating a charging base of a self-moving robot and a method for locating a charging base of a self-moving robot. The specific technical solution of the disclosure is as follows.

A system for locating a charging base of a self-moving robot, includes: the charging base including infrared signal emitters which are configured to emit infrared signals to form signal areas; and the self-moving robot including: a driving unit configured to drive the self-moving robot to move, infrared signal receivers configured to receive the infrared signals emitted by the infrared signal emitters, and a controller configured to construct a charging base locating area according to the infrared signals of the signal areas received by the infrared signal receivers, update statistical values of locating grids in the charging base locating area according to a subsequent condition of the infrared signals of the signal areas received by the infrared signal receivers of the self-moving robot, and determine a position of the charging base based on the statistical values, and the charging base locating area and an environment map constructed by the self-moving robot are in a preset mapping relation.

Optionally, the controller is configured to construct the charging base locating area according to the infrared signals of the signal areas received by the infrared signal receivers includes: according to types of the infrared signals of the signal areas received by the infrared signal receiver for the Nth time, determining, by the controller, that a position of a preset distance right ahead of the infrared signal receiver received the infrared signals is a central point, and an area covered by a preset range serves as the charging base locating area; and the preset range covers the position of the charging base, and N is a natural number greater than or equal to 1.

Optionally, the types of the infrared signals of the signal areas include base avoiding signals and non-base-avoiding signals; when the infrared signal receiver receives the base avoiding signals, it is determined that a position of a first preset distance right ahead of the infrared signal receiver received the base avoiding signals is the central point and an area covered by a square whose side length is a first preset value serves as the charging base locating area, and the first preset value is greater than M times of a maximum emission distance of the infrared signal emitter corresponding to the base avoiding signals; when the infrared signal receiver receives the non-base-avoiding signals, it is determined that a position of a second preset distance right ahead of the infrared signal receiver received the non-base-avoiding signals is the central point and an area covered by a square whose side length is a second preset value serves as the charging base locating area, the second preset value is greater than M times of a maximum emission distance of the infrared signal emitter corresponding to the non-base-avoiding signals; and M is a natural number greater than or equal to 2, the second preset distance is greater than the first preset distance, and the second preset value is greater than the first preset value.

Optionally, the controller updates the statistical values of the locating grids in the charging base locating area according to the subsequent condition of the infrared signals of the signal areas received by the infrared signal receivers of the self-moving robot includes: judging, by the controller, whether the infrared signal receiver receives the infrared signals of the signal areas again, and when the infrared signal receiver receives the infrared signals of the signal areas again, counting, by the controller, the locating grids located in a receiving range of the infrared signal receiver received the infrared signals in the charging base locating area by adding 1 in an accumulated mode; and the locating grids are cells formed by carrying out grid type division on the charging base locating area.

Optionally, the controller determines the position of the charging base based on the statistical values includes: screening out, by the controller, the locating grid with a highest statistical value; and determining, by the controller, corresponding actual physical coordinates of the locating grid with the highest statistical value in the environment map based on the preset mapping relation.

A method for locating a charging base of a self-moving robot includes: receiving, by the self-moving robot, infrared signals in signal areas formed by emission of infrared signal emitters of the charging base; and constructing, by the self-moving robot, a charging base locating area according to the infrared signals received by the infrared signal receivers of the self-moving robot, and updating, by the self-moving robot, statistical values of locating grids in the charging base locating area according to a subsequent condition of the infrared signals of the signal areas received by the infrared signal receivers of the self-moving robot, and determining, by the self-moving robot, a position of the charging base based on the statistical values; and the charging base locating area and an environment map constructed by the self-moving robot are in a preset mapping relation.

Optionally, constructing, by the self-moving robot, the charging base locating area according to the infrared signals received by the infrared signal receivers of the self-moving robot includes: according to types of the infrared signals of the charging base received by the infrared signal receiver for the Nth time, determining, by the self-moving robot, that a position of a preset distance right ahead of the infrared signal receiver received the infrared signals is a central point, and an area covered by a preset range serves as the charging base locating area; and the preset range covers the position of the charging base, and N is a natural number greater than or equal to 1.

Optionally, the types of the infrared signals of the charging base include base avoiding signals and non-base-avoiding signals; when the infrared signal receiver receives the base avoiding signals, the self-moving robot determines that a position of a first preset distance right ahead of the infrared signal receiver received the base avoiding signals is the central point and an area covered by a square whose side length is a first preset value serves as the charging base locating area, and the first preset value is greater than M times of a maximum emission distance of the infrared signal emitter corresponding to the base avoiding signals; when the infrared signal receiver receives the non-base-avoiding signals, the self-moving robot determines that a position of a second preset distance right ahead of the infrared signal receiver received the non-base-avoiding signals is the central point and an area covered by a square whose side length is a second preset value serves as the charging base locating area, and the second preset value is greater than M times of a maximum emission distance of the infrared signal emitter corresponding to the non-base-avoiding signals; and M is a natural number greater than or equal to 2, the second preset distance is greater than the first preset distance, and the second preset value is greater than the first preset value.

Optionally, updating, by the self-moving robot, the statistical values of the locating grids in the charging base locating area according to the subsequent condition of the infrared signals of the signal areas received by the infrared signal receivers of the self-moving robot includes: judging, by the self-moving robot, whether the infrared signal receiver receives the infrared signals of the signal areas again, and when the infrared signal receiver receives the infrared signals of the signal areas again, counting the locating grids located in a receiving range of the infrared signal receiver received the infrared signals in the charging base locating area by adding 1 in an accumulated mode; and the locating grids are cells formed by carrying out grid type division on the charging base locating area.

Optionally, determining, by the self-moving robot, the position of the charging base based on the statistical values includes: screening out, by the self-moving robot, the locating grid with a highest statistical value; and determining, by the self-moving robot, corresponding actual physical coordinates of the locating grid with the highest statistical value in the environment map based on the preset mapping relation.

DETAILED DESCRIPTION OF THE EMBODIMENTS

The technical solutions in the embodiments of the disclosure will be described in detail below with reference to the drawings in the embodiments of the disclosure. It is to be understood that the specific embodiments described below are for the purpose of explaining the disclosure only and are not intended to limit the disclosure. In the following description, specific details are given to provide a thorough understanding of the embodiments. However, it will be understood by those of ordinary skill in the art that the embodiments can be practiced without these specific details. For example, circuits can be shown in block diagrams in order to avoid obscuring the embodiments in unnecessary detail. In other instances, well-known circuits, structures and techniques can not be shown in detail in order not to obscure the embodiments.

Figure 1:
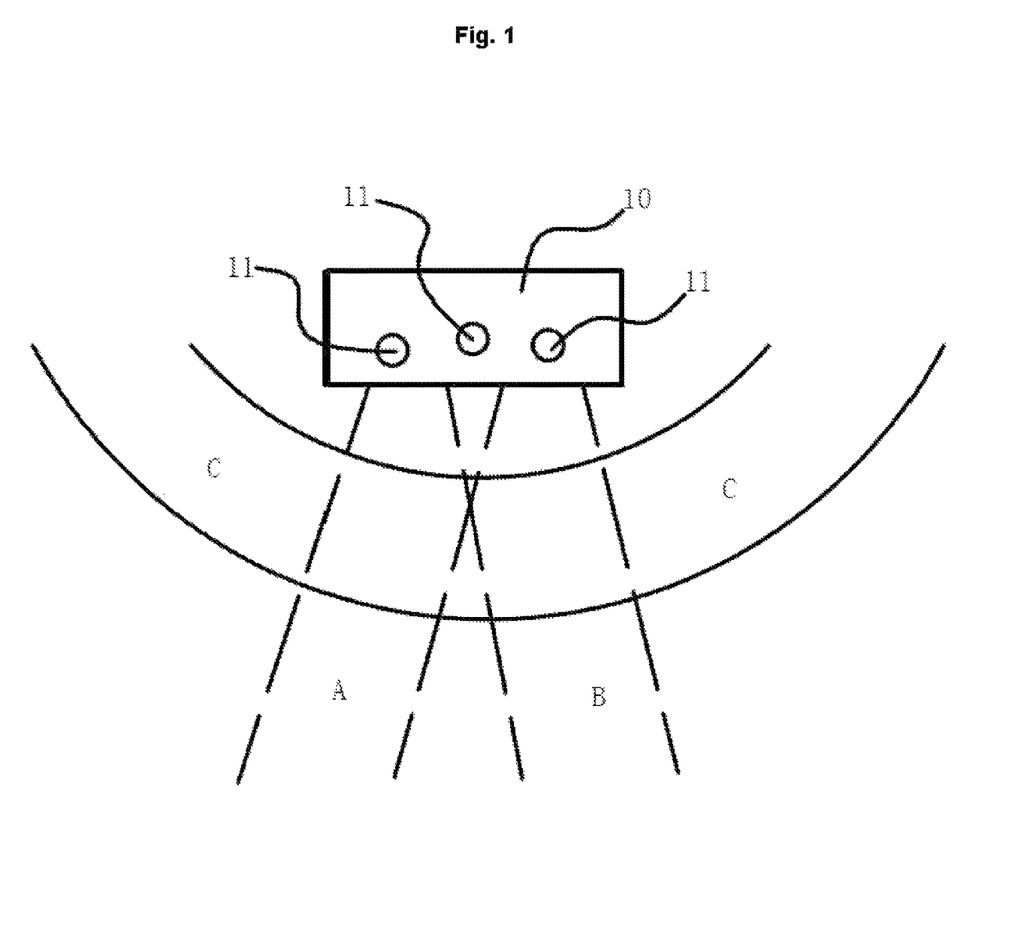
FIG. 1 is a schematic diagram of signal distribution of a charging base according to an embodiment of the disclosure.

A system for locating a charging base of a self-moving robot provided by an embodiment includes the charging base and the self-moving robot. The charging seat is provided with infrared signal emitters which are configured to emit infrared signals to form signal areas, and parameters such as distance, range and signal strength of the infrared signals emitted by different types of the infrared signal emitters are different. As shown in FIG. 1, three small circles marked with 11 represent three infrared signal emitters disposed on the charging base. The infrared signals emitted by the infrared signal emitters form a base avoiding signal area C, a left signal area A and a right signal area B respectively. Of course, according to different product design requirements, the number and arrangement positions of the infrared signal emitters disposed on the charging base can be different, and the signal areas which are formed can be correspondingly changed. The self-moving robot can be a cleaning robot, a service robot, a logistics robot, a pet robot or a toy robot and other different types of robots, and all the self-moving robots have functions of automatic mapping, automatic returning to the charging base and the like. In the embodiment, a sweeping robot is taken as an example, and for convenience of description, it is hereinafter referred to simply as a robot.

Figure 2:
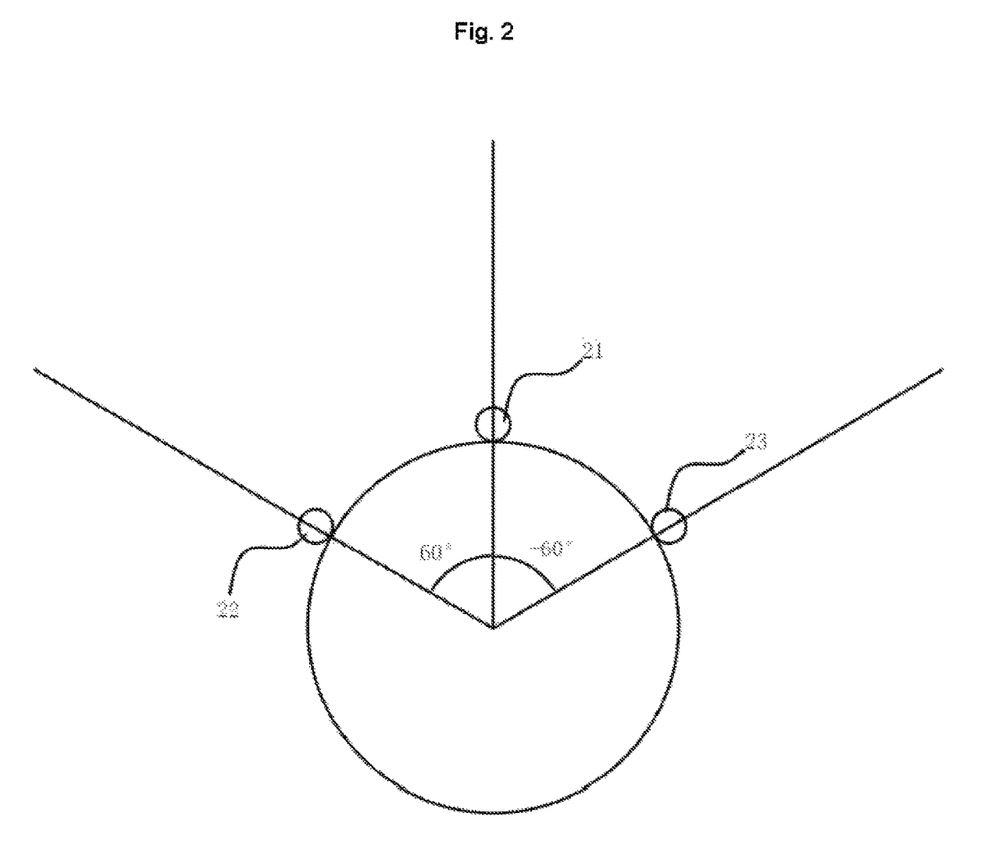
FIG. 2 is a distribution diagram of infrared signal receivers of a self-moving robot according to an embodiment of the disclosure.
Figure 3:
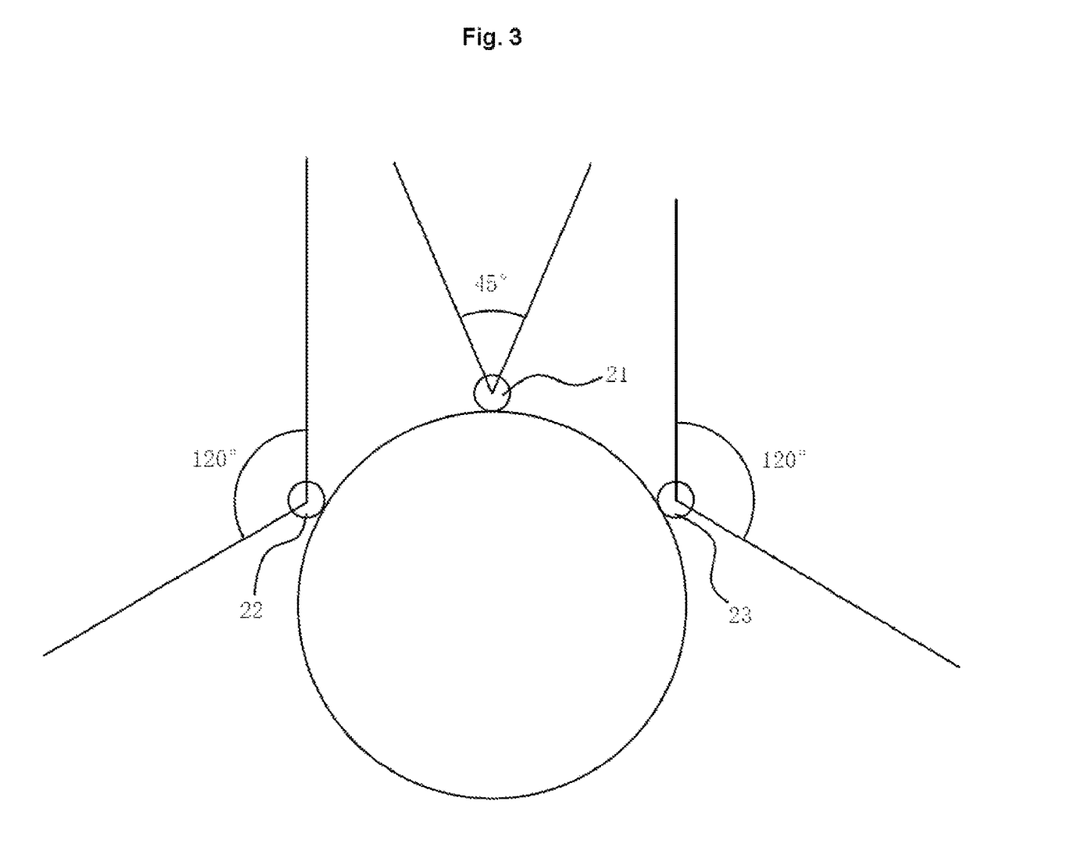
FIG. 3 is a schematic diagram of a receiving range of infrared signal receivers of a self-moving robot according to an embodiment of the disclosure.

The robot includes a driving unit, infrared signal receivers, a controller, a collision sensor, a speedometer, a gyroscope and other devices. The driving unit is two driving wheels disposed at a bottom of the robot and configured to drive the robot to move. The driving wheel is provided with the speedometer which can detect number of running turns of the driving wheel, and therefore the walking distance of robot can be obtained. Through detection data of the gyroscope, the direction of the robot can be obtained. The infrared signal receivers are disposed on the top or the periphery of the robot and the infrared signal receivers can be correspondingly configured according to specific product design requirements. As shown in FIG. 2, the infrared signal receivers of the robot according to the embodiment are disposed at the front part of the robot, and small circles marked with 21, 22 and 23 represent the infrared signal receivers. The infrared signal receiver 21 is disposed at the right front part of the robot and is set to 0°; the infrared signal receiver 22 is disposed at the left front part of the robot and is set to 60°; and the infrared signal receiver 23 is disposed at the right front part of the robot and is set to −60°. The infrared signal receivers can receive the infrared signals emitted by the infrared signal emitters from different angles. As shown in FIG. 3, a receiving angle of the infrared signal receiver 21 of the robot is 45°, and receiving angles of the infrared signal receiver 22 and the infrared signal receiver 23 are both 120°, so that the robot can effectively detect the infrared signals sent by the charging base within the range of 240° in the advancing direction of the robot. The controller is configured to construct a charging base locating area according to the infrared signals of the signal areas received by the infrared signal receivers, the shape and size of the charging base locating area which is constructed are determined according to the types of the received infrared signals and can be set to be square or circular, and the size of the charging base locating area is suitable for covering the charging base. Then, the controller intermittently detects the infrared signals of the charging base in the reciprocating walking process according to the subsequent situation that the infrared signal receivers of the robot receive the infrared signals of the signal areas, for example, the robot conducts 弓-shaped walking and detection at the same time; and for example, in the process of navigating to a target point, the robot may pass near the charging base and detect the infrared signals of the charging base the like. Each time the robot receives the infrared signals of the charging base, statistical values of locating grids in the charging base locating area are updated. The locating grids are cells formed by dividing the charging base locating area according to a certain form, each locating grid corresponds to a coordinate value and the statistical value, the coordinate value is not changed, and the statistical value is changed along with a statistical result. Finally, the controller determines the position of the charging base based on the statistical values, and a position of the locating grid with a highest statistical value is the position of the charging base. The charging base locating area and an environment map constructed by the self-moving robot are in a preset mapping relation, the preset mapping relation can be in a plurality of modes as long as effective conversion between the charging base locating area and the environment map can be achieved and an effective physical position can be finally determined, and subsequent embodiments will explain one of the implementation modes in detail.

According to the embodiment of the system, the position of the charging base can be estimated according to the charging base locating area constructed when the robot receives the infrared signals of the charging base, and meanwhile, the position which is estimated of the charging base can be continuously adjusted according to the relation between the charging base locating area and the infrared signal receivers when the infrared signals are received in the subsequent motion process of the robot, so that the position which is determined of the charging base is more accurate. The robot can carry out estimation of the position of the charging base while performing sweeping, thus the sweeping work is not affected, the position of the charging base can also be obtained in real time, meanwhile, the robot can immediately execute a base returning action when receiving a base returning instruction, and does not need to stop to analyze the position of the charging base, so that the base returning efficiency and accuracy are greatly improved. In addition, the whole system does not need to be additionally provided with other sensors or component devices, and can be realized only by utilizing existing components of the robot, so that the performance of the robot can be improved, the cost does not need to be increased, and the cost performance ratio is greatly improved.

As one implementation mode, that the controller is configured to construct the charging base locating area according to the infrared signals of the signal areas received by the infrared signal receivers includes: according to types of the infrared signals of the signal areas received by the infrared signal receiver for the Nth time, the controller determines that a position of a preset distance right ahead of the infrared signal receiver received the infrared signals is a central point, an area covered by a preset range serves as the charging base locating area, and the preset range covers the position of the charging base. N is a natural number greater than or equal to 1, and in the embodiment, the type of the infrared signals of the signal areas of the charging base received by the robot for the first time is taken as a standard. Of course, the type of the infrared signals received by the robot for the third time or the fourth time can also be taken as the standard, and the specific number of times can be designed according to research and development requirements. The types of the infrared signals can be divided according to emission distances of the infrared signal emitters, such as a long-distance area and a short-distance area, and can also be divided according to distribution areas of the infrared signals, such as a left area, a right area and a middle area, and can also be divided according to functions of the infrared signals, for example, a base avoiding signal and a guide signal, or an obstacle avoiding signal and a non-obstacle-avoiding signal, and the like. The types of the infrared signals which are received are different, the positions and sizes of constructed charging base locating areas are different, so that the preset distance and preset range can be configured according to specific product design requirements, only if the charging base locating area can cover the position of the charging base. According to the system provided by the embodiment of the disclosure, the coverage of the charging base locating area is determined through the type of the infrared signals which are received, therefore, on the premise that the charging base is effectively covered by the charging base locating area, storage resources and operation resources can be efficiently utilized, and unnecessary resource waste is avoided.

Figure 4:
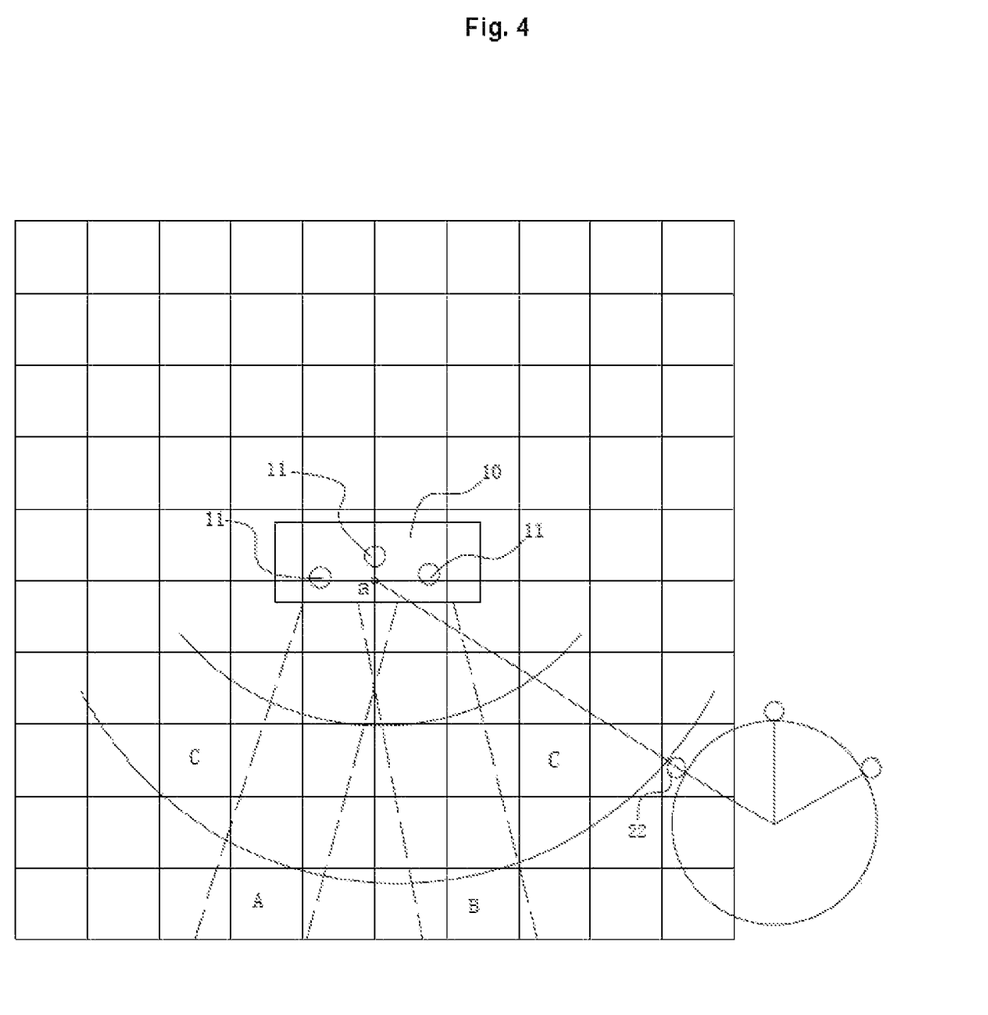
FIG. 4 is a schematic diagram of constructing a charging base locating area when a self-moving robot receives base avoiding signals according to an embodiment of the disclosure.

Specifically, in the embodiment, the types of the infrared signals of the signal areas include base avoiding signals and non-base-avoiding signals. When the infrared signal receiver receives the base avoiding signals, it is determined that a position of a first preset distance right ahead of the infrared signal receiver received the base avoiding signals is the central point and an area covered by a square whose side length is a first preset value serves as the charging base locating area, the first preset value is greater than two times or three times of a maximum emission distance of the infrared signal emitter corresponding to the base avoiding signal, so that the charging base locating area which is constructed can effectively cover the position of the charging base. The right ahead of the infrared signal receiver refers to a direction from the center point of the robot to the infrared signal receiver and extending outwards from the infrared signal receiver. As shown in FIG. 4, the infrared signal receiver 22 of the robot receives a base avoiding signal of the area C sent by the infrared signal emitter 11 of the charging base 10 for the first time, at the moment, the robot constructs a square area whose side length is 1 meter as the charging base locating area taking the right ahead of the infrared signal receiver 22 as a direction and taking a position point a which is the first preset distance away from the infrared signal receiver 22 as the center point, and the first preset distance is 0.5 meter. The charging base locating area is divided into 10*10=100 locating grids. The XY direction for constructing the charging base locating area is the same as the XY direction for constructing the environment map by the robot, so that a simpler mapping relation between the charging base locating area and the environment map is realized.

When the infrared signal receiver receives the non-base-avoiding signals, for example, signals of the area A or the area B are received, as with the above-described principle, at the moment, the robot determines that a position of a second preset distance right ahead of the infrared signal receiver received the non-base-avoiding signals is the central point and an area covered by a square whose side length is a second preset value serves as the charging base locating area, the second preset value is greater than two times or three times of the maximum emission distance of the infrared signal emitters corresponding to the non-base-avoiding signals, so that the constructed charging base locating area can effectively cover the position of the charging base. In the embodiment, the second preset distance is 4 meter, and the second preset value is 8 meter. Since the base avoiding signals are around the charging base and the emission distance of the non-base-avoiding signals is farther, the second preset distance is set to be larger than the first preset distance and the second preset value is set to be larger than the first preset value, then the range of the locating area can be reasonably determined, and the position where the charging base is located is ensured to be covered. Of course, M value can also be set to other values, but is optimally 2, since twice the length is already enough to cover the position where the charging base is located, and too large values result in unnecessary waste of storage and computing resources.

According to the embodiment of the system, locating areas with different positions and ranges are constructed according to the types of the received infrared signals, the construction mode is simple and practical, too much complex operation is not needed, and thus popularization and application are facilitated.

Figure 5:
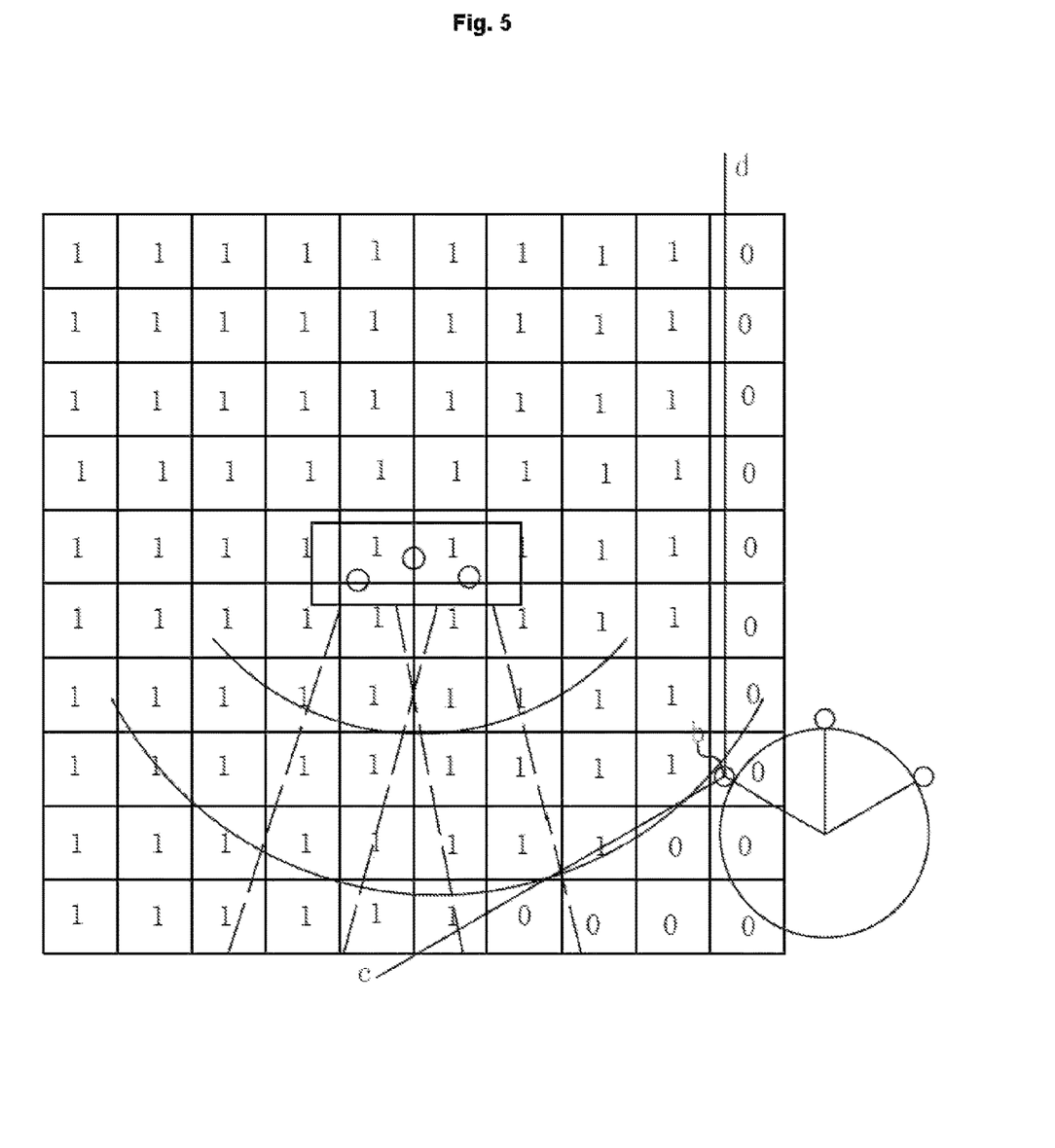
FIG. 5 is a schematic diagram of numerical statistics performed by a self-moving robot when the self-moving robot receives infrared signals and constructs a charging base locating area according to an embodiment of the disclosure.
Figure 6:
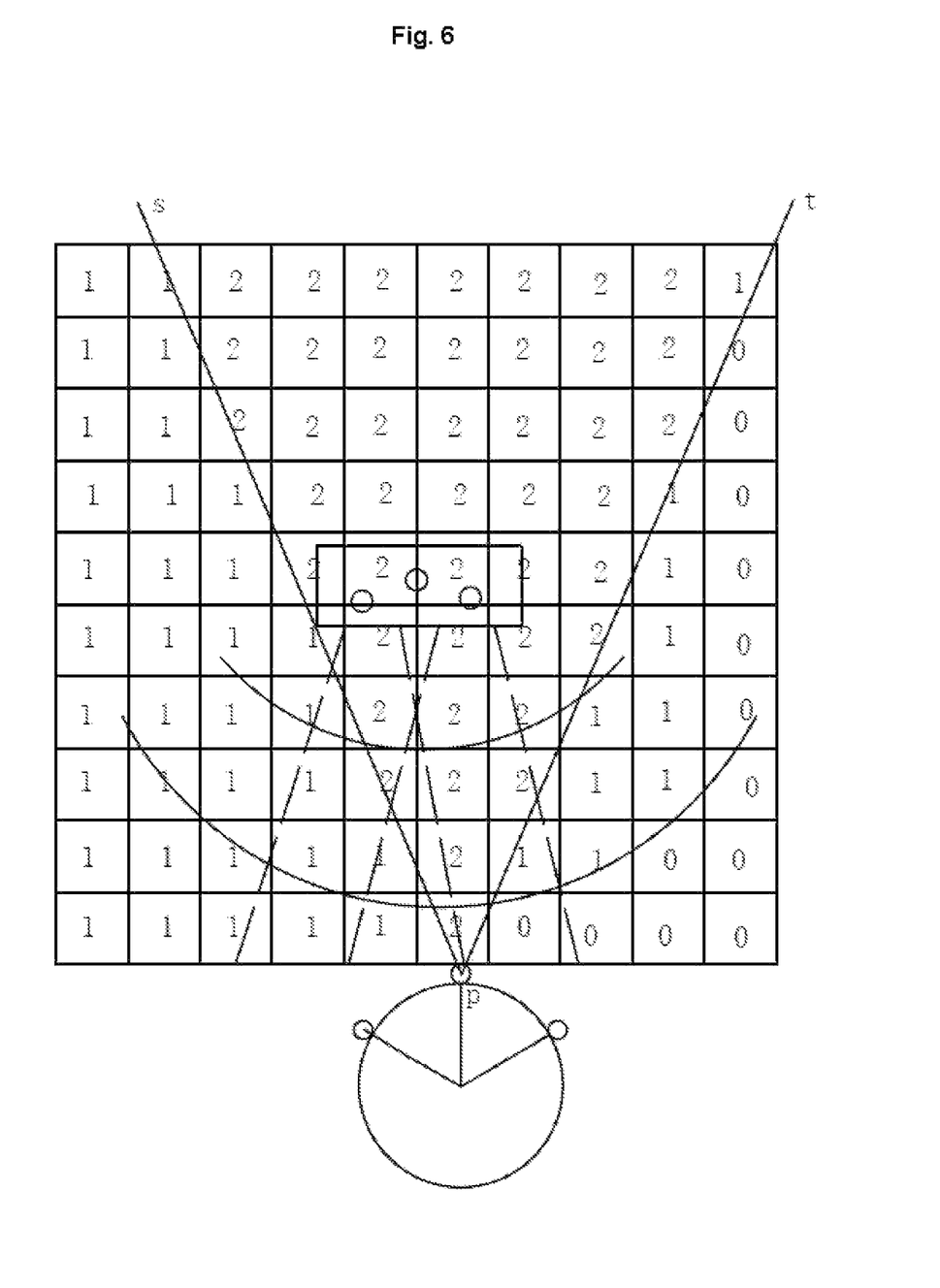
FIG. 6 is a schematic diagram of numerical statistics performed by a self-moving robot when the self-moving robot receives infrared signals again according to an embodiment of the disclosure.

As one implementation mode, the controller updates the statistical values of the locating grids in the charging base locating area according to the subsequent condition of the infrared signals of the signal areas received by the infrared signal receivers of the robot. The locating grids are cells formed by carrying out grid type division on the charging base locating area. Specifically, the controller judges whether the infrared signal receiver receives the infrared signals of the signal areas again, and when the infrared signal receiver receives the infrared signals of the signal areas again, the controller count the locating grids located in a receiving range of the infrared signal receiver received the infrared signals in the charging base locating area by adding 1 in an accumulated mode. As shown in FIG. 5, the robot has already performed statistics for the first time the robot has received the infrared signals and constructed the charging base locating area. Taking the receiving angle cbd of the current infrared signal receiver as a range, 1 is added to the statistical values of the locating grids in the range, namely, the statistical values are changed from 0 to 1, and the initial value 0 of the locating grids not in the range is kept. If the center point of the locating grid is within the angle range, the locating grid is within the receiving range. Of course, the statistical value can also be refined to 1 digit after the decimal point, for example, if one half of the locating grid is within the receiving range, 0.5 is added to the statistical value of the locating grids, 0.3 is added if one third of the locating gird is within the receiving range, 0.2 is added if one fifth of the locating gird is within the receiving range, and the like, and specifically, the statistical value can be set according to product design requirements. As shown in FIG. 6, when the robot receives the infrared signals again, at the moment, the infrared signal receiver at the right front part of the robot receives the signal in the right signal area, taking the receiving angle spt of the infrared signal receiver at the right front part of the robot for reference, the statistical values in the angle range are all added with 1, namely, the statistical values which are 1 originally become 2, and the statistical values which are originally 0 become 1. The statistical values outside the angle range remain unchanged. In the subsequent movement process of the robot, the robot continuously carries out statistical counting on the locating grids, the higher the counting is, the higher the probability of the charging base at the position is, the statistical distribution generally conforms to Gaussian distribution, the middle is high, and the periphery is low, that is, the statistical value of the position where the charging base is located is the highest, and then the statistical value is gradually reduced towards the periphery. Through the embodiment of the system of the disclosure, the position of the charging pile can be calculated in real time, and the locating of the charging pile becomes more and more accurate along with the increase of the counting times of the infrared signals. The statistical times can be between 10 and 30, and generally, the accurate position of the charging base can be obtained through 15 times of statistics.

As one implementation mode, the controller determines the position of the charging base based on the statistical values includes: the controller screens out the locating grid with a highest statistical value; and the controller determines the corresponding actual physical coordinates of the locating grid with the highest statistical value in the environment map based on the preset mapping relation. Assuming that the resolution of the charging base locating area is 14.28 cm, the side length of the charging base locating area is 50 cm*2=100 cm, the number of the locating grids is 7*7=49, the maximum radius of base avoiding signal emission is 50 cm, the origin coordinate is (0, 0), the robot coordinate is (1, 1), the robot direction is 90 degrees, and the direction of the infrared signal receiver received the infrared signal is the positive 60 degrees of the robot, the center coordinate of the charging base locating area is x=1+0.5*cos(60°+90°)=0.567, y=1+0.5*sin(60°+90°)=1.25, namely, (0.567, 1.25). The locating grid coordinate of the upper left corner of the charging base locating area is x=0.567−0.1428*3=0.139, y=1.25+0.1428*3=1.678, namely, (0.139, 1.678). The first row of second grid coordinate is x=0.139+0.1428=0.282, y=1.678, namely, (0.282, 1.678). And by analogy, the actual physical coordinates of all the locating grids can be calculated. According to the system provided by the embodiment of the disclosure, the actual position of the charging base can be quickly determined through the simple mapping relation, so that the robot can navigate back to the base more efficiently.

Figure 7:
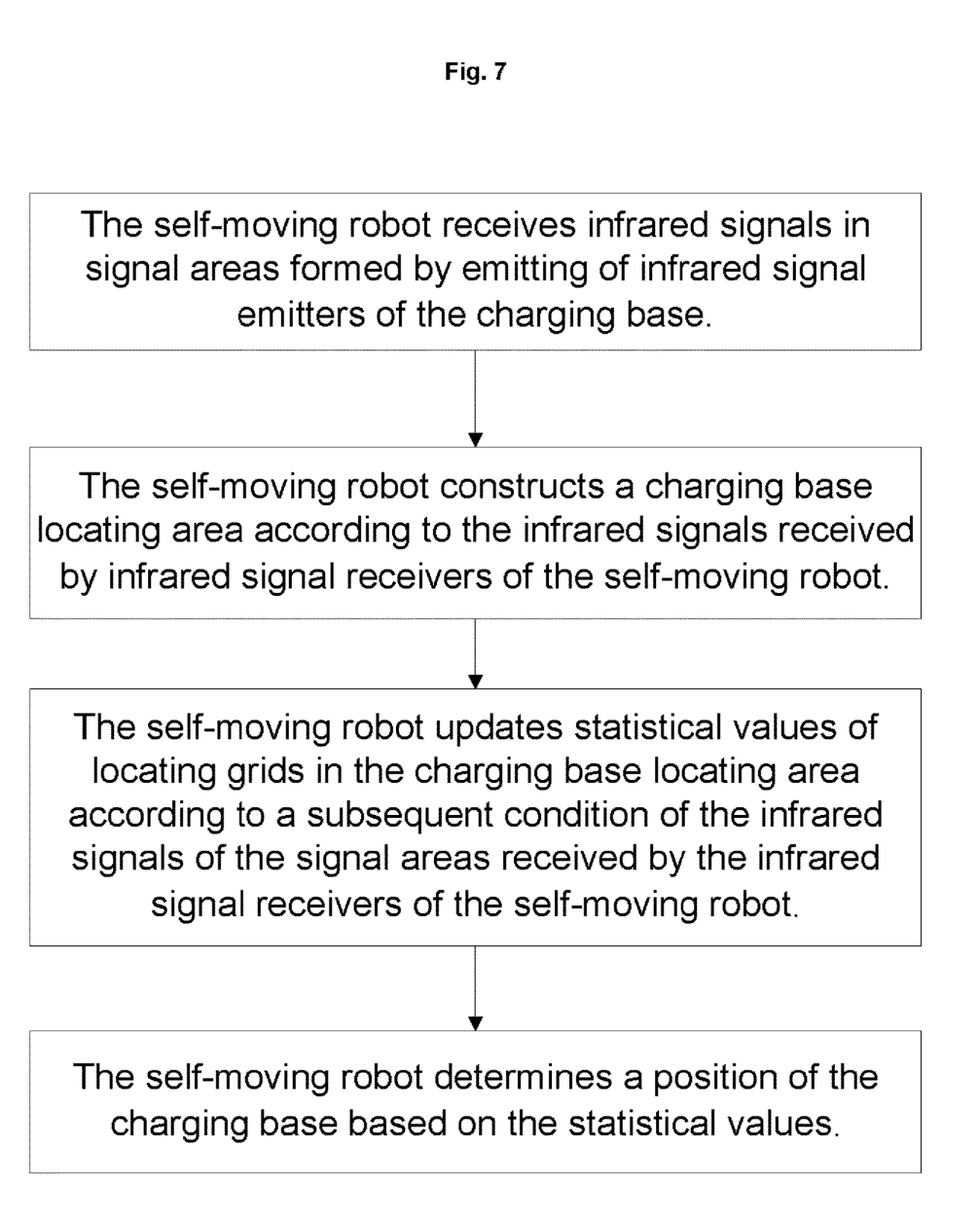
FIG. 7 is a flow diagram of a method for locating a charging base of a self-moving robot according to an embodiment of the disclosure.

As shown in FIG. 7, a method for locating a charging base of a self-moving robot includes: the self-moving robot receives infrared signals in signal areas formed by emitting of infrared signal emitters of the charging base; and the self-moving robot constructs a charging base locating area according to the infrared signals received by the infrared signal receivers, and the self-moving robot updates statistical values of locating grids in the charging base locating area according to a subsequent condition of the infrared signals of the signal areas received by the infrared signal receivers of the self-moving robot, and the self-moving robot determines a position of the charging base based on the statistical values. The self-moving robot constructs the charging base locating area according to the infrared signals of the signal areas received by the infrared signal receivers, the shape and size of the constructed charging base locating area are determined according to the type of the received infrared signals and can be set to be square or circular, and the size of the constructed charging base locating area is suitable for covering the charging base. Then, the robot discontinuously detects the infrared signals of the charging base in the reciprocating walking process according to the subsequent situation that the infrared signal receivers of the self-moving robot receive the infrared signals of the signal areas, for example, the self-moving robot conducts 弓-shaped walking and detection at the same time; and for example, in the process of navigating to a target point, the robot may pass near the charging base and detect the infrared signals of the charging base, and the like. Each time the self-moving robot receives the infrared signals of the charging base, statistical values of locating grids in the charging base locating area are updated. The locating grids are cells formed by dividing the charging base locating area according to a certain form, each locating grid corresponds to a coordinate value and the statistical value, the coordinate value is not changed, and the statistical value is changed along with a statistical result. Finally, the controller determines the position of the charging base based on the statistical values, and a position of the locating grid with a highest statistical value is the position of the charging base. The charging base locating area and an environment map constructed by the self-moving robot are in a preset mapping relation, the preset mapping relation can be in a plurality of modes as long as effective conversion between the charging base locating area and the environment map constructed by the self-moving robot can be achieved and an effective physical position can be finally determined, and subsequent embodiments will explain one of the implementation modes in detail.

According to the embodiment of the method, the position of the charging base can be estimated according to the charging base locating area constructed when the robot receives the infrared signals of the charging base, meanwhile, the position which is estimated of the charging base can be continuously adjusted according to the relation between the charging base locating area and the infrared signal receivers when the infrared signals are received in the subsequent motion process of the robot, so that the position which is determined of the charging seat is more accurate. The robot can carry out estimation of the position of the charging base while performing sweeping, thus the sweeping work is not affected, the position of the charging base can also be obtained in real time, meanwhile, the robot can immediately execute a base returning action when receiving a base returning instruction, and does not need to stop to analyze the position of the charging base, so that the base returning efficiency and the accuracy are greatly improved. In addition, the whole system does not need to be additionally provided with other sensors or component devices, and can be realized only by utilizing existing components of the robot, so that the performance of the robot can be improved, the cost does not need to be increased, and the cost performance ratio is greatly improved.

As one implementation mode, the self-moving robot constructs the charging base locating area according to the infrared signals received by the infrared signal receivers of the self-moving robot includes: according to types of the infrared signals of the charging base received by the infrared signal receiver for Nth time, the self-moving robot determines that a position of a preset distance right ahead of the infrared signal receiver received the infrared signal is a central point, and an area covered by a preset range serves as the charging base locating area. The preset range covers the position of the charging base, and N is a natural number greater than or equal to 1. In the embodiment, the type of the infrared signals of the signal areas of the charging base received by the robot for the first time is taken as a standard. Of course, the type of the infrared signals received for the third time, the fourth time and the like can also be taken as the standard, and the specific number of times can be designed according to research and development requirements. The types of the infrared signals can be divided according to emission distances of the infrared signal emitters, such as a long-distance area and a short-distance area, and can also be divided according to distribution areas of the infrared signals, such as a left area, a right area and a middle area, and can also be divided according to functions of the infrared signals, for example, a base avoiding signal and a guide signal, or an obstacle avoiding signal and a non-obstacle-avoiding signal, and the like. The types of infrared signals which are received are different, and the positions and sizes of constructed charging base locating areas are different, so that the preset distance and the preset range can be configured according to specific product design requirements, only if the charging base locating area can cover the position of the charging base. According to the system provided by the embodiment of the disclosure, the coverage area of the charging base locating area is determined through the type of the infrared signals which are received, therefore, on the premise that the charging base is effectively covered by the charging base locating area, storage resources and operation resources can be efficiently utilized, so that unnecessary resource waste is avoided.

Specifically, the types of the infrared signals of the charging base include base avoiding signals and non-base-avoiding signals. When the infrared signal receiver receives the base avoiding signals, it is determined that a position of a first preset distance right ahead of the infrared signal receiver received the base avoiding signal is the central point and an area covered by a square whose side length is a first preset value serves as the charging base locating area, the first preset value is greater than two times or three times of a maximum emission distance of the infrared signal emitter corresponding to the base avoiding signal, so that the charging base locating area which is constructed can effectively cover the position of the charging base. The right ahead of the infrared signal receiver refers to a direction from the center point of the robot to the infrared signal receiver and extending outwards from the infrared signal receiver. As shown in FIG. 4, the infrared signal receiver 22 of the robot receives a base avoiding signal of the area C sent by the infrared signal emitter 11 of the charging base 10 for the first time, at the moment, the robot constructs a square area whose side length is 1 meter as the charging base locating area taking the right front of the infrared signal receiver 22 as a direction and taking a position point a which is the first preset distance away from the infrared signal receiver 22 as the center point, and the first preset distance is 0.5 meter. The charging base locating area is divided into 10*10=100 locating grids. The XY direction for constructing the charging base locating area is the same as the XY direction for constructing the environment map by the self-moving robot, so that a simpler mapping relation between the charging base locating area and the environment map is realized.

When the infrared signal receiver receives the non-base-avoiding signals, for example, signals of the area A or the area B are received, as with the above-described principle, at the moment, the robot determines that a position of a second preset distance right ahead of the infrared signal receiver received the non-base-avoiding signals is the central point and an area covered by a square whose side length is a second preset value serves as the charging base locating area, the second preset value is greater than two times or three times of a maximum emission distance of the infrared signal emitter corresponding to the non-base-avoiding signals, so that the constructed charging base locating area can effectively cover the position of the charging base. In the embodiment, the second preset distance is 4 meter, and the second preset value is 8 meter. Since the base avoiding signals are around the charging base and the emission distance of the non-base-avoiding signals is farther, the second preset distance is set to be larger than the first preset distance and the second preset value is set to be larger than the first preset value, thus the range of the locating area can be reasonably determined, and the position where the charging base is located is ensured to be covered. Of course, the M value can also be set to other values, but is optimally 2, since twice the length is already enough to cover the position where the charging base is located, and too large values result in unnecessary waste of storage and computing resources.

According to the embodiment of the method, locating areas with different positions and ranges are constructed according to the types of the received infrared signals, the construction mode is simple and practical, too much complex operation is not needed, and thus popularization and application are facilitated.

As one implementation mode, the self-moving robot updates the statistical values of the locating grids in the charging base locating area according to the condition of the infrared signals of the signal areas received by the infrared signal receivers, and the locating grids are cells formed by carrying out grid type division on the charging base locating area. The step includes: the self-moving robot judges whether the infrared signal receiver receives the infrared signals of the signal areas again, and when the infrared signal receiver receives the infrared signals of the signal areas again, the self-moving robot count the locating grids located in a receiving range of the infrared signal receiver received the infrared signals in the charging base locating area by adding 1 in an accumulated mode. As shown in FIG. 5, the robot has already performed statistics for the first time the robot has received the infrared signals and constructed the charging base locating area. Taking the receiving angle cbd of the current infrared signal receiver as a range, 1 is added to the statistical values of the locating grids in the range, namely, the statistical values are changed from 0 to 1, and the initial value 0 of the locating grids not in the range is kept. If the center points of the locating grids are within the angle range, the locating grids are within the receiving range. Of course, the statistical values can also be refined to 1 digit after the decimal point, for example, if one half of the locating grid is within the receiving range, 0.5 is added to the statistical values of the locating grids, 0.3 is added if one third of the locating gird is within the receiving range, 0.2 is added if one fifth of the locating girds are within the receiving range, and the like, and specifically, the statistical values can be set according to product design requirements. As shown in FIG. 6, when the robot receives the infrared signals again, at the moment, the infrared signal receiver at the right front part of the robot receives the signals of the right signal area, taking the receiving angle spt of the infrared signal receiver on the right front part of the robot for reference, the statistical values in the angle range are all added with 1, then the statistical values which are 1 originally become 2, and the statistical values which are 0 originally become 1. The statistical values outside the angle range remain unchanged. In the subsequent movement process of the robot, the robot continuously carries out statistical counting on the locating grids, the higher the counting is, the higher the probability of the charging base at the position is, the statistical distribution generally conforms to Gaussian distribution, the middle is high, and the periphery is low, that is, the statistical value of the position where the charging base is located is the highest, and then the statistical value is gradually reduced towards the periphery. Through the method provided by the embodiment of the disclosure, the position of the charging pile can be calculated in real time, and the locating of the charging pile becomes more and more accurate along with the increase of the statistical times of the infrared signals. The statistical times can be between 10 and 30, and the accurate position of the charging base can be obtained through 15 times of statistics.

As one implementation mode, the self-moving robot determines the position of the charging base based on the statistical values includes: the self-moving robot screens out the locating grid with a highest statistical value; and the self-moving robot determines corresponding actual physical coordinates of the locating grid with the highest statistical value in the environment map based on the preset mapping relation. Assuming that the resolution of the charging base locating area is 14.28 cm, the side length of the charging base locating area is 50 cm*2=100 cm, the number of locating grids is 7*7=49, the maximum radius of base avoiding signal emission is 50 cm, the origin coordinate is (0, 0), the robot coordinate is (1, 1), the robot direction is 90 degrees, and the direction of the infrared signal receiver received the infrared signals is the positive 60 degrees of the robot, the center coordinates of the charging base locating area is x=1+0.5*cos(60°+90°)=0.567, y=1+0.5*sin(60°+90°)=1.25, namely, (0.567, 1.25). The locating grid coordinates of the upper left corner of the charging base locating area are x=0.567−0.1428*3=0.139, y=1.25+0.1428*3=1.678, namely (0.139, 1.678). The first row of second grid coordinate is x=0.139+0.1428=0.282, y=1.678, namely (0.282, 1.678). And by analogy, the actual physical coordinates of all the locating grids can be calculated. According to the method provided by the embodiment of the disclosure, the actual position of the charging base can be quickly determined through the simple mapping relation, so that the robot can navigate back to the base more efficiently.

It is apparent that the above-described embodiments are only some, but not all, embodiments of the disclosure, and the technical solutions among the various embodiments can be combined with each other. In addition, if terms "center", "upper", "lower", "left", "right", "vertical", "horizontal", "inner", "outer", and the like are present in the embodiments, unless otherwise specified, orientation or position relationships indicated by these terms are orientation or position relationships shown in the drawings, are adopted not to indicate or imply that indicated devices or components must be in specific orientations or structured and operated in specific orientations but only to conveniently describe the disclosure and thus should not be understood as limits to the disclosure. The terms "first", "second", "third" and the like, if are present in the embodiments, are to facilitate distinction of the relevant features and are not to be construed as indicating or implying relative importance, order, or number of technical features.

Those skilled in the art should understand that all or part of the steps in the methods for implementing the implementation modes can be completed by instructing related hardware through programs, and the programs are stored in a storage medium, and include a plurality of instructions enabling a single-chip microcomputer, chip, or processor to perform all or part of the steps of the methods described in the embodiments of the disclosure. The foregoing storage medium includes any medium that can store program codes, such as a U disk, a removable hard disk, a Read-Only Memory (ROM), a Random Access Memory (RAM), a magnetic disk, or an optical disc. When the programs are executed, the steps including the above method embodiments are executed.

Finally, it is to be noted that the above embodiments serve only to illustrate the technical solutions of the disclosure and not to limit the same; although the disclosure has been described in detail with reference to embodiments, it will be understood by those of ordinary skill in the art that the technical solutions described in the embodiments can still be modified, or part or all of the technical features can be equivalently replaced; and the modification or replacement does not make the essence of the corresponding technical solutions deviate from the scope of the technical solution of each embodiment of the disclosure.

What is claimed is:

1. A system for locating a charging base of a self-moving robot, comprising:
   the charging base, comprising infrared signal emitters which are configured to emit infrared signals to form signal areas; and
   the self-moving robot, comprising:
   a driving unit, configured to drive the self-moving robot to move, the driving unit is two driving wheels disposed at a bottom of the self-moving robot;
   infrared signal receivers, configured to receive the infrared signals emitted by the infrared signal emitters; and
   a controller, configured to construct a charging base locating area according to the infrared signals of the signal areas received by the infrared signal receivers, update statistical values of locating grids in the charging base locating area according to a subsequent condition of the infrared signals of the signal areas received by the infrared signal receivers of the self-moving robot, and determine a position of the charging base based on the statistical values;
   wherein the charging base locating area and an environment map constructed by the self-moving robot are in a preset mapping relation,
wherein the controller updates the statistical values of the locating grids in the charging base locating area according to the subsequent condition of the infrared signals of the signal areas received by the infrared signal receivers of the self-moving robot comprises:
   judging, by the controller, whether the infrared signal receiver receives the infrared signals of the signal areas again, and when the infrared signal receiver receives the infrared signals of the signal areas again, counting, by the controller, the locating grids located in a receiving range of the infrared signal receiver received the infrared signals in the charging base locating area by adding 1 in an accumulated mode;
   wherein the locating grids are cells formed by carrying out grid type division on the charging base locating area,
wherein the controller determines the position of the charging base based on the statistical values comprises:
   screening out, by the controller, the locating grid with a highest statistical value; and
   determining, by the controller, corresponding actual physical coordinates of the locating grid with the highest statistical value in the environment map based on the preset mapping relation.

2. The system according to claim 1, wherein the controller is configured to construct the charging base locating area according to the infrared signals of the signal areas received by the infrared signal receivers comprises:
   according to types of the infrared signals of the signal areas received by the infrared signal receiver for Nth time, determining, by the controller, that a position of a preset distance right ahead of the infrared signal receiver received the infrared signals is a central point, and an area covered by a preset range serves as the charging base locating area;
   wherein the preset range covers the position of the charging base, and N is a natural number greater than or equal to 1.

3. The system according to claim 2, wherein the types of the infrared signals of the signal areas comprise base avoiding signals and non-base-avoiding signals;
   when the infrared signal receiver receives the base avoiding signals, it is determined that a position of a first preset distance right ahead of the infrared signal receiver received the base avoiding signals is the central point and an area covered by a square whose side length is a first preset value serves as the charging base locating area, and the first preset value is greater than M times of a maximum emission distance of the infrared signal emitter corresponding to the base avoiding signals;
   when the infrared signal receiver receives the non-base-avoiding signals, it is determined that a position of a second preset distance right ahead of the infrared signal receiver received the non-base-avoiding signals is the central point and an area covered by a square whose side length is a second preset value serves as the charging base locating area, the second preset value is greater than M times of a maximum emission distance of the infrared signal emitter corresponding to the non-base-avoiding signals; and
   M is a natural number greater than or equal to 2, the second preset distance is greater than the first preset distance, and the second preset value is greater than the first preset value.

4. The system according to claim 3, wherein the controller updates the statistical values of the locating grids in the charging base locating area according to the subsequent condition of the infrared signals of the signal areas received by the infrared signal receivers of the self-moving robot comprises:
   judging, by the controller, whether the infrared signal receiver receives the infrared signals of the signal areas again, and when the infrared signal receiver receives the infrared signals of the signal areas again, counting, by the controller, the locating grids located in a receiving range of the infrared signal receiver received the infrared signals in the charging base locating area by adding 1 in an accumulated mode;

wherein the locating grids are cells formed by carrying out grid type division on the charging base locating area.

5. The system according to claim 3, wherein the controller determines the position of the charging base based on the statistical values comprises:

screening out, by the controller, the locating grid with a highest statistical value; and determining, by the controller, corresponding actual physical coordinates of the locating grid with the highest statistical value in the environment map based on the preset mapping relation.

\* \* \* \* \*